Oct. 24, 1967    E. E. RUSH    3,348,367
FILTER BAG AND METHOD OF MAKING SAME
Filed Jan. 4, 1965

INVENTOR
E. E. RUSH
BY
ATTORNEYS

United States Patent Office 3,348,367
Patented Oct. 24, 1967

3,348,367
FILTER BAG AND METHOD OF
MAKING SAME
Elton E. Rush, Bartlesville, Okla., assignor to Phillips
Petroleum Company, a corporation of Delaware
Filed Jan. 4, 1965, Ser. No. 423,221
1 Claim. (Cl. 55—381)

This invention relates to an improved filter bag or tube. In one aspect this invention relates to a method for making said improved filter bag or tube.

The recovery of solids from a suspension of finely divided solids in gases is conventionally effected in a bag filter which comprises a group of upright porous bags through which the gaseous suspension is passed, leaving a portion of the finely divided solids on the walls of the bags and causing a portion to fall into a subjacent collecting zone. The bags are made of woven material which withstands the conditions required by the specific application. In filtering carbon black from the smoke or effluent gas from a carbon black reactor, the bags are usually fabricated of fiber glass or strength and heat resistance, but other materials such as "Orlon" have been utilized. In this type of filtering, the "pores" of the bag become plugged to such an extent that the pressure drop across the bags becomes excessive and it is necessary to mechanically or sonically vibrate the bags while reversing the flow of gas through the bags in order to dislodge the black particles adhering to the bags.

Said bags are commonly fabricated from a length of flexible flat woven cloth which is provided with a narrow selvage at opposite side edges thereof. Said side edges are then joined at said selvages to form a tubular bag having a longitudinal seam therein. Said bags can be fabricated in any suitable diameter and are commonly fabricated in diameters ranging from about 6 to 18 inches. Filter bags employed in filtering carbon black from the smoke or effluent gases from a carbon black reactor are commonly about 12 inches in diameter and 25 feet in length.

During filtering operations employing such bags, it has been observed that during the period when gas flow through said bags is reversed, said bags collapse with a substantial portion of the transverse cross-section of the collapsed bag being more or less in the form of a three or four-pointed star (see FIGURE 4). It has also been observed that very frequently there is obtained a breaking of the bag material along said longitudinal seam before it breaks elsewhere, resulting in failure of the bag before the end of the normally expected life of the bag.

The present invention provides a solution for the above-described problem by providing an improved filter bag fabricated from a flexible porous cloth provided with a wider than normal and less flexible selvage at opposite side edges thereof, and wherein the longitudinal seam of said bag is formed completely within said less flexible selvage.

Thus, an object of this invention is to provide an improved filter bag. Another object of this invention is to provide a method of making said improved filter bag. Another object of this invention is to provide an improved filter bag having a stronger longitudinal seam therein. Still another object of this invention is to provide an improved filter bag which is resistant to cloth breakage along the longitudinal seam therein. Another object is to provide an improved filter bag wherein the longitudinal seam therein is formed completely within a wider than normal selvage which is less flexible than the remainder of the cloth said bag is made from. Other aspects, objects, and advantages of the invention will be apparent to those skilled in the art in view of this disclosure.

Thus, according to the invention, there is provided an improved filter bag formed from a length of porous cloth provided with a wider than normal selvage provided along each of two opposite side edges of said cloth, said bag comprising: a tubular body formed by joining said opposite side edges of said cloth in a seam formed completely within the width of said wider than normal selvages; and a plurality of spaced apart rows of stitching applied longitudinally along said seam, all of said rows of stitching also being disposed completely within the width of said selvages.

Further, according to the invention, there is provided a method of forming a filter tube useful for filtering solids from gases, said method comprising: providing a length of filter cloth having a first selvage along one side edge thereof and a second selvage along the opposite side edge thereof, each said selvage having a width which is greater than the width of the selvage normally provided on filter cloth and said greater width being sufficient to accommodate within its limits a seam as described hereinafter; forming a first fold by folding said one side edge over upon itself, said first fold being formed completely within the width of said first selvage; forming a second fold by folding said opposite side edge over upon itself, said second fold being formed completely within the width of said second selvage; interlocking and overlapping said first fold and said second fold to form an interlocked joint comprising four thicknesses of said cloth; and converting said joint into a seam by applying a plurality of rows of stitching therethrough, said rows of stitching all being within the width of said selvages.

It is to be noted that the longitudinal seam in the filter bag of the invention is formed completely within the wider than normal selvage provided along opposite side edges of the filter cloth material. As indicated above, I am aware that tubular filter bags have been made in the prior art by joining opposite side edges of the filter cloth material at the narrow selvage employed in the prior art. However, as discussed further hereinafter, the manner of joining said opposite side edges at the narrow selvages employed in the prior art does not provide a seam which is formed completely within said selvages, and thus little, if any, advantage is taken of said selvages in providing additional strength along said seam.

Figure 1:
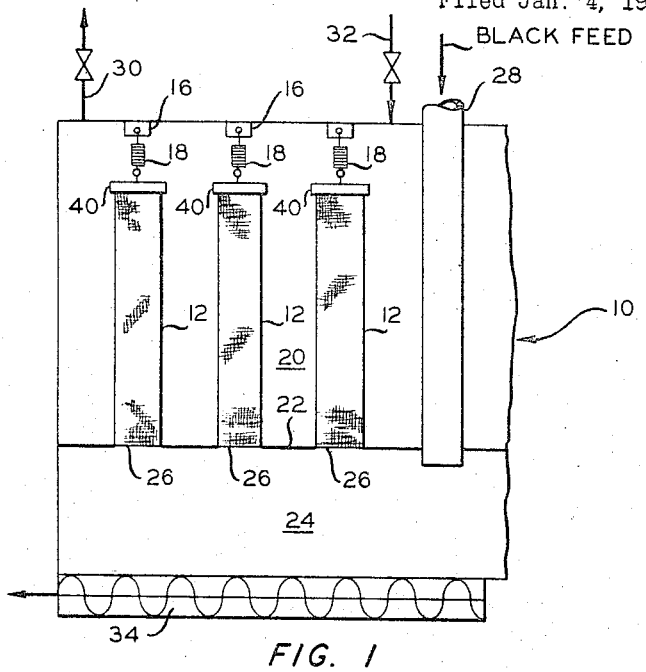
FIGURE 1 is a fragmentary elevational view in partial section showing a portion of a bag filter apparatus wherein filter bags in accordance with the invention are employed.

Referring to FIGURE 1, a bag filter unit 10 (for example, shown in more detail in U.S. Patent 2,871,978, issued to G. J. Webster and N. R. Wilson) is provided with a plurality of filtering compartments each containing several filter bags 12. These bags are suspended from the roof 14 of the unit by supports 16 and flexible linkage 18. The upper compartment 20 of the unit above partition 22 is open to the lower compartment 24 only through openings 26 which lead into filter bags 12. An inlet 28 for the gaseous suspension to be freed of its solids is axially positioned so as to deliver the gaseous solids suspension below partition 22 from which the gas containing particulate solids passes upwardly and laterally through bags 12 into compartment 20 from which the gas is vented through conduit 30. During backpressuring, i.e., when the bags are being cleaned, the flow of gas through conduit 30 is cut off and pressuring gas is injected through conduit 32 so as to pass through bags 12 and into compartment 24. In some applications of the process, bags 12 are vibrated during said backpressuring. After a short backpressuring period, the flow of gas through conduit 32 is cut off and conduit 30 is open to flow so as to allow gas from compartment 24 to refill or repressure bags 12 and continue the filtering operation. The solids removed from the gas by the bags drop into compartment 24 and are transferred by a rotary scraper (not shown) into conveyor 34 for removal from the unit. The various compartments in filter unit 10 are backpressured sequentially so that only one is on backpressuring to clean the bags at any given time.

Figure 2:
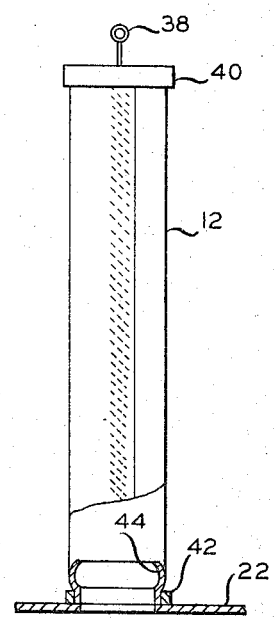
FIGURE 2 is a view in elevation and partly in section showing further details of the manner of employing said filter bags in a bag filter apparatus.

FIGURE 2 is an enlarged view showing in more detail the installation of a filter bag in accordance with the invention. Said bag is suspended in an upright position by ring 38 attached to cap 40. The upper end of the tubular body of the bag can be attached to said cap 40 in any suitable manner. Any other suitable manner of suspending said bag in the bag filter apparatus can be employed. For example, the upper end of said bag can be formed and the bag suspended as in U.S. Patent 2,805,731.

Figure 3:
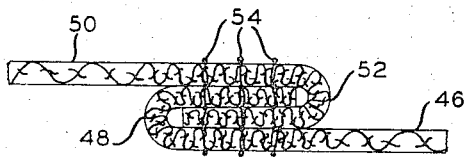
FIGURE 3 is a view in transverse section of a portion of the wall of a filter bag having a seam formed completely within the selvages of the filter cloth in accordance with this invention.

In FIGURE 3, reference numerals 46 and 50 designate opposite side edge portions of a length of filter cloth which have been brought together to form the seam shown. Each of said side edge portions is provided with a selvage at what is normally the outer edge or extremity of the flat piece of filter cloth. In the drawing said selvage is indicated by the more heavily shaded portion representing a closer, less flexible weave than the more porous weave which forms the remainder of the cloth. In weaving cloth which is to be used as filter cloth, it is common practice to form the selvage in a close, plain weave and to form the remainder of the cloth of a more loosely woven twill weave. However, the instant invention is not to be limited to employing a plain weave in the selvage and a twill weave in the remainder of the cloth. Any suitable weave can be utilized in either said selvage or in the remainder of the cloth. The only requirement of the invention is that the selvage be formed with a more closely woven weave and be less flexible than the remainder of the cloth.

In the prior art the selvage provided along the opposite side edges of the filter cloth material is seldom, if ever, more than about 0.38 inch in width. This is all that is necessary since the purpose of the selvage in the prior art is to prevent raveling. In contrast, in the practice of this invention, there is provided a filter cloth having a selvage at each of opposite side edges thereof which is at least 0.75 inch in width and which can be as wide as three inches, or wider. Preferably, said selvage in the filter cloths employed in the practice of the invention is from about 1.5 to about 2 inches in width. The actual width of the selvage provided will be determined to some extent by the thickness of the filter cloth and the service in which it is to be employed. For example, a thicker filter cloth which is to be employed in more severe service will have a wider selvage than a light cloth which is employed in less severe service.

In forming the longitudinal seam in a filter bag in accordance with this invention, a first fold is made by folding one side edge of the filter cloth over upon itself as at 48 in FIGURE 3. It will be noted said first fold is formed completely within the selvage portion of the cloth. A second fold is then formed by folding the opposite side edge of the cloth over upon itself as at 52. Again, it will be noted said second fold is formed completely within the selvage portion of the cloth. Said first fold and said second fold are then interlocked and overlapped, as shown, to form an interlocked joint comprising four webs or thicknesses of said cloth. Said joint is then converted into a seam by providing a plurality of spaced apart rows of stitching 54 therethorugh. In applying said rows of stitching the outer rows of said stitching will be at least 0.125 inch from what is normally the inner edge of the selvage which is adjacent thereto. (The inner edge of the selvage, as here referred to, is the edge of the selvage which is adjacent the remainder of the cloth.) Any suitable number of rows of stitching can be employed in the practice of the invention. However, it is preferred to employ at least two rows of said stitching.

In operation, in a given time cycle when the inner wall of a filter bag 12 becomes partially plugged with finely divided solids, the flow of gas into the mouth of bags 12 from compartment 24 is terminated in a selected compartment 20 by closing the valve in conduit 30. Said bags 12 are then vibrated by sonic horns or other means (not shown) and the valve in conduit 32 is opened so as to force a reverse flow of gas through the wall of said bags and into compartment 24, thereby dislodging adhering particles of carbon black or other solids from the bags and carrying said solids into compartment 24 for recovery. At the end of the reverse flow or backpressuring phase of the cycle of operation, the valve in conduit 32 is closed to cut off the flow of backpressuring gas and the valve in conduit 30 is opened to repressure said filter bags 12 with solids containing gas from compartment 24.

Figure 4:
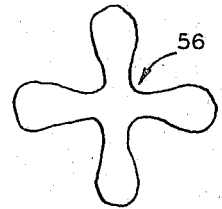
FIGURE 4 is a schematic representation of the transverse cross-section of a collapsed filter bag.

During said reverse flow or backpressuring operation, said filter bags 12 collapse into a shape or form having a transverse cross-section roughly that of a three or four-pointed star as shown in FIGURE 4. The form or shape of said transverse cross-section varies throughout the length of the bag. In a lower portion of the bag, and somewhat above the connection of the lower end of the bag which is held in place over tube 44 by means of a suitable clamp 42, said cross-section will be even more sharply defined than in FIGURE 4 with sharper points and more sharply defined "inner" bends 56. In an intermediate portion of the bag said bends 56 and said points become less sharply defined than in FIGURE 4. Near the top of the bag adjacent cap 40 said transverse cross-section remains substantially cylindrical.

When repressuring after said reverse flow or backpressuring operation, the bags fill from the bottom up in a wave motion which travels rapidly up the bag and rapidly transforms the collapsed bag to an expanded or pressured condition. Said wave motion comes to a sudden stop at the closed upper end of the bag. It is not intended to limit the invention by any theories as to specific or actual causes of the failures of the prior art filter bags along said longitudinal seams, or as to why the present invention eliminates said failures. However, it is presently believed that said wave motion, and particularly the sudden termination thereof at the top of the bag, produces a circumferential tension or shock loading on the bag, especially in the upper region thereof. This causes a slippage of the warp yarns along or over the fill yarns along the stitching of the longitudinal seam, exposes said fill yarns, and weakens the cloth or bag. Said slipping of the warp yarns has been observed. It has also been observed that a majority of the bag failures occur in the upper portion of the bag where said circumferential tension or shock loading is believed to be greatest.

Figure 5:
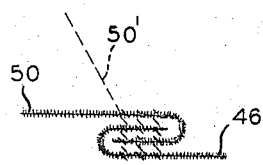
FIGURE 5 is a schematic representation of a seam formed in accordance with the prior art and illustrating the severe flexing action which occurs along the stitching of said seam when said seam is positioned at a bend in a collapsed filter bag.

Another factor which may contribute to the failures of the prior art bags along the longitudinal seam is the action which can occur when said seam falls along a sharp bend as commonly occurs at the point of said star when the bag is collapsed as in backpressuring. Said seam, being much less flexible than the remainder of the bag, will resist bending or flexing along the more or less sharp bends or points of said cross-section of the collapsed bag, and the more flexible portion of the remainder of the bag can exert a pulling force or strain along one of the outer rows of stitching, thus placing a severe strain upon the cloth along said row of stitching. This action is illustrated in FIGURE 5 where the dotted line 50' represents the moved position of the portion of the filter cloth which is adjacent said seam. It will be noted that line 50' forms a sharp angle with the outer row of stitching adjacent thereto. It will also be noted that neither of the outer rows of stitching in FIGURE 5 is placed in the selvage.

Figure 6:
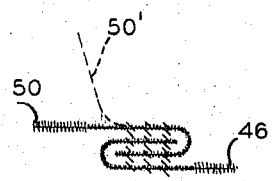
FIGURE 6 is a schematic representation of a seam in a filter bag formed in accordance with this invention and illustrating the improved flexing action which occurs along said seam in a collapsed filter bag.

Referring now to FIGURE 6, wherein the flexing action which occurs when a seam in a filter bag fabricated in accordance with this invention becomes disposed at a sharp bend or curve is illustrated, it will be first noted that said seam is formed completely within the width of the two selvages at the opposite side edges of the filter cloth material. Secondly, it will be noted that the line 50' does not form a sharply defined angle with the outer row of stitching which is adjacent thereto. Since the seam is formed completely within the selvage material, the less flexible selvage material resists the formation of a sharp angle along said outer row of stitching and instead of a sharp angle, as in FIGURE 5, there is obtained a curved transition zone, resulting in much less strain on the cloth along said outer row of stitching. In both of FIGURES 5 and 6, the upper portion of lines 50' forms essentially the same angle with the vertical.

To further illustrate the invention, reference is now made to the testing of two filter bags fabricated in accordance with the invention. In the test, two fiber glass bags 25 feet long and 12 inches in diameter are suspended in conventional manner and are operated along with a number of conventional bags in a filter bag apparatus on a standard cycle of filtering, backflowing, and repressuring (filtering). The filtering pressure is in the range of 8 to 14 inches of water and the backflow pressure is in the range of 5 to 6 inches of water. After a period of operation of several months, it is found there are failures in a number of the conventional bags whereas there are no failures in the bags fabricated in accordance with the invention.

While in the practice of the invention the filter cloth is provided with a wider than normal selvage, and the longitudinal seams in the filter bags of the invention are formed completely within said selvage, it will be understood that said selvage should not be unduly wide. An unduly wide selvage, being formed of a closer, less porous weave than the remainder of the filter cloth, will reduce the filtering capacity of the filter bag. Thus, while the outer rows of stitching in the longitudinal seam are at least 0.125 inch from an inner edge of said selvage, it is preferred that they not be more than about 0.25 inch from said inner edge. If only two rows of stitching are employed, both rows of stitching are outer rows.

While certain embodiments of the invention have been described for illustrative purposes, the invention obviously is not limited thereto. Various other modifications will be apparent to those skilled in the art in view of this disclosure. Such modifications are within the spirit and scope of the invention.

I claim:

An improved filter bag, suitable for filtering solids from gases, and formed from a length of porous filter cloth provided with a first selvage along one longitudinal side edge thereof and a second selvage along the opposite longitudinal side edge thereof, each said selvage having a width within the range of 0.75 to 3 inches which is wider than the selvage normally provided on filter cloth and each said selvage being formed of a closer, less flexible weave than the more porous weave which forms the remainder of said cloth, said bag comprising: a tubular body; a longitudinal joint in said body; said joint being formed by folding said one side edge over upon itself to form a first fold completely within the width of said first selvage, folding said opposite side edge over upon itself to form a second fold completely within the width of said second selvage, and overlapping and interlocking said first fold and said second fold; and a plurality of spaced apart rows of stitching, each extending longitudinally along and through said joint, and each outer row of said stitching being positioned at least 0.125 inch from the inner edge of the one of said selvages which is adjacent thereto, said inner edge being defined as the edge of the selvage which is woven to the remainder of said cloth.

References Cited

UNITED STATES PATENTS

| | | | |
|---|---|---|---|
| 489,590 | 1/1893 | Marble et al. | 112—10 X |
| 1,208,193 | 12/1916 | Nightingale. | |
| 1,924,492 | 8/1933 | Goldwyn. | |
| 2,028,220 | 1/1936 | Kelly. | |
| 2,461,240 | 2/1949 | Seruggs. | |
| 2,551,126 | 5/1951 | Hersey | 55—294 |
| 2,726,611 | 12/1955 | Cloutier | 112—10 X |
| 2,743,450 | 5/1956 | Kling | 2—275 X |
| 2,805,731 | 9/1957 | Kron | 55—341 X |
| 2,871,978 | 9/1959 | Webster et al. | 55—341 X |
| 2,884,090 | 4/1959 | Perlis | 55—294 |
| 2,906,371 | 9/1959 | Jones | 55—294 X |
| 2,985,941 | 5/1961 | Riedesel et al. | 139—383 X |

FOREIGN PATENTS

| | | |
|---|---|---|
| 300,869 | 11/1954 | Switzerland. |

OTHER REFERENCES

Carmichael et al.: Callaway Textile Dictionary, Callaway Mills, La Grange, Ga., first edition, 1947, pp. 304, 343, and 344.

HARRY B. THORNTON, *Primary Examiner.*

FRANK W. LUTTER, *Examiner.*

D. TALBERT, *Assistant Examiner.*